W. M. Lee.
Feeding Bees.

N° 2,482.
33,486.

Patented Oct. 15, 1861.

Witnesses:
M. M. Ward
E. Breed

Inventor:
W. M. Lee
Daniel Breed
atty

UNITED STATES PATENT OFFICE.

W. M. LEE, OF ROSENDALE, WISCONSIN.

IMPROVEMENT IN BEE-HIVES.

Specification forming part of Letters Patent No. 33,486, dated October 15, 1861.

*To all whom it may concern:*

Be it known that I, W. M. LEE, of Rosendale, in the county of Fond du Lac and State of Wisconsin, have invented a new and useful Improvement in Bee-Hives; and I do hereby declare that the following is a full and exact description thereof, reference being had to the accompanying drawings, and to the letters of reference marked thereon.

My invention consists in a peculiar construction and arrangement of divided bee-hive with removable comb-racks and honey-boxes, and also miller-traps and bee-feeders.

Figure 1:
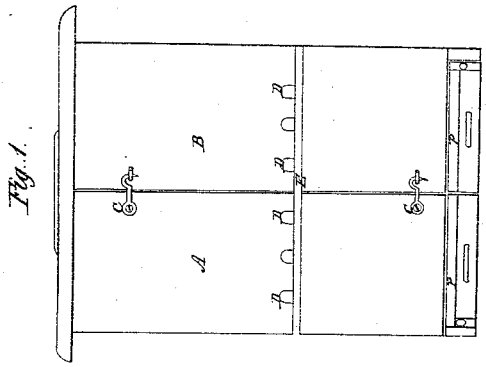
Figure 2:
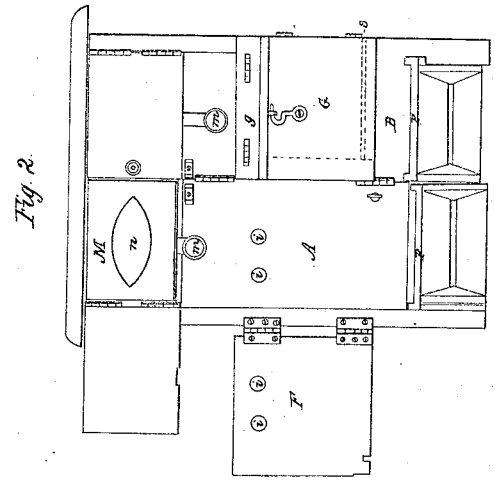
Figure 3:
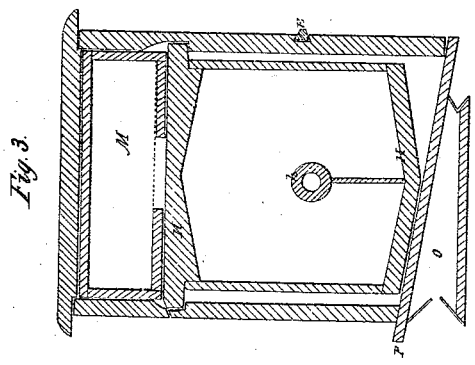
Figure 4:
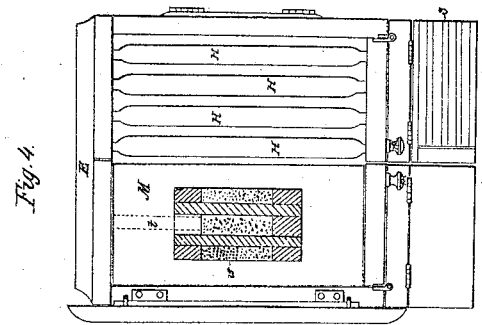

In the accompanying drawings, Figure 1 is a front view of my improved bee-hive. Fig. 2 is a back view of the same, one of the doors and one of the feed-boxes being swung back in order better to show the peculiar construction. Fig. 3 is a vertical section through the hive from front to rear. Fig. 4 is a top view of the hive.

My hive is divided into two parts A and B. There being no partition, they form a single hive, in both sides of which the queen bee will deposit her eggs, so that the opening of the hive will leave brood-comb in both the parts A and B.

In dividing a swarm a corresponding portion of an empty hive is immediately placed by each of the two parts A and B (which have just been separated) so as to form two new complete hives of the same size as the original before its division. In order better to fasten the two separable parts together, I use a dovetail strip E, which is slipped into a corresponding groove. This strip projects in front and also serves the secondary purpose of a ledge or door-sill for the bees to light upon before entering the hive through the bee-holes D, Fig. 1. The bees can also enter the hive at the bottom board P, as will be explained.

Upon the rear of the hive are attached boxes F and G for feeding the bees. These boxes have hinged lids *g* for introducing the feed, and they communicate with the main parts of the hive by bee-passages *i i*. They are also provided with a rack S, Fig. 4, near the bottom, (indicated by dotted lines, Fig. 2,) and a partition *f*, (also dotted line, Fig. 2,) in order to pour the feed under the rack without disturbing the bees.

In the main body of the hive is arranged a series of removable comb-racks H, Figs. 3 and 4. Each of these racks has a ring *h* near the center through which the bees can freely pass to the center of the comb. This arrangement allows the bees to retreat to the center of the hive in cold weather and feed thence outward.

The upper part of the hive is provided with honey-boxes M, having a slide or perforated plate in the bottom. This slide is held shut by means of an elastic strip of rubber or other spring (shown in dotted lines at *t*, Fig. 4,) and may be opened at pleasure by means of the ring and cord or band *m*. The boxes M have glazed windows at the top and also small end windows *n*. Either the boxes M or one or more of the racks H may be withdrawn whenever honey is wanted from the hive, an empty box or rack being substituted.

At the lower part of the hive are two miller-traps O, corresponding to the two parts A and B of the hive. These traps are attached to the bottom board P, the ends of the same being provided with retreating entrances *o*, leading the millers into the trap, but effectually preventing their egress. The bottom boards of the hive, which form the top of these traps, are capable of sliding on the wedge-shaped supports or legs in order to close the bottom of the hive at night, and thus shut out the millers. A screen or perforated plate is placed in the board P to admit air to the hive through the trap when the boards P are closed. In Fig. 2 the board P on the right hand is pushed backward so as to close the hive; but the corresponding board P on the left is pushed forward, leaving the space T for the bees to enter.

By my arrangement of hive every part can be examined at pleasure without disturbing the bees. The racks can be removed for inspecting the comb in the central part of the hive. If millers should chance to get into the hive by neglecting properly to close the same at night, their presence can be detected, the rack removed and cleansed, or another substituted.

In the full-sized bee-hive, instead of the rings *h*, perforated balls may be substituted.

I am aware that various modes have been employed for dividing swarms of bees without swarming, therefore I confine my claims to my above-described arrangement and operations.

Having thus described my invention, what I claim, and desire to secure by Letters Patent of the United States, is—

1. Dividing the hive-rack vertically through the center without a partition in such manner as equally or nearly equally to divide the brood-comb, the bees, and the honey, substantially as set forth.

2. The peculiar construction and arrangement of moth-trap, with slides for closing the hive at night, and ventilating-screen, substantially as set forth.

3. The honey-boxes provided with screens operated by springs on the bottom, substantially as herein described.

4. The arrangement of the removable strip dovetailed into the front for the purpose of holding the two parts of the hive and for the bees to light upon, as set forth.

W. M. LEE.

In presence of—
  W. L. VINCENT,
  B. F. EDDY.